United States Patent
Peng et al.

(10) Patent No.: US 12,514,518 B2
(45) Date of Patent: Jan. 6, 2026

(54) BRAIN AMYLOID PET PROCESSING SYSTEM AND OPERATION METHOD THEREOF AND NON-TRANSITORY COMPUTER READABLE MEDIUM

(71) Applicants: Taipei Medical University (TMU), Taipei (TW); TAIPEI VETERANS GENERAL HOSPITAL, Taipei (TW)

(72) Inventors: Syu-Jyun Peng, Zhubei (TW); Tse-Hao Lee, Taipei (TW); Jong-Ling Fuh, Taipei (TW)

(73) Assignees: Taipei Medical University (TMU), Taipei (TW); Taipei Veterans General Hospital, Taipei (TW)

( * ) Notice: Subject to any disclaimer, the term of this patent is extended or adjusted under 35 U.S.C. 154(b) by 153 days.

(21) Appl. No.: 18/493,080

(22) Filed: Oct. 24, 2023

(65) Prior Publication Data

US 2024/0341701 A1    Oct. 17, 2024

(30) Foreign Application Priority Data

Apr. 11, 2023   (TW) .................................. 112113511

(51) Int. Cl.
*A61B 6/03* (2006.01)
*A61B 5/00* (2006.01)
(Continued)

(52) U.S. Cl.
CPC .............. *A61B 6/037* (2013.01); *A61B 5/055* (2013.01); *A61B 5/4088* (2013.01); *G01N 33/6896* (2013.01)

(58) Field of Classification Search
CPC ....... A61B 6/037; A61B 5/055; A61B 5/4088; A61B 6/501; A61B 6/506; A61B 6/5217; G01N 33/6896
See application file for complete search history.

(56) References Cited

U.S. PATENT DOCUMENTS

| 2014/0226898 A1* | 8/2014 | Lilja | G06T 15/08 382/154 |
| 2015/0235358 A1 | 8/2015 | Momose | |

(Continued)

FOREIGN PATENT DOCUMENTS

| CN | 104237526 A | 12/2014 |
| CN | 110352034 A | 10/2019 |

(Continued)

OTHER PUBLICATIONS

Imabayashi, Etsuko, et al., "Comparison between brain CT and MRI for voxel-based morphometry of Alzheimer's disease.", Brain and Behavior, 3.4, 2013, 487-493.

(Continued)

*Primary Examiner* — Kaitlyn E Sebastian
(74) *Attorney, Agent, or Firm* — McBee Moore & Vanik, IP, LLC

(57) ABSTRACT

An operation method of a brain amyloid PET processing system includes steps as follows. The whole brain white matter amyloid PET image is extracted from the smoothed amyloid PET image in the range of the whole brain white matter mask of the normalized brain space, and the uptake value with the preset maximum ratio in the whole brain white matter amyloid PET image is calculated; in the smoothed amyloid PET image of the normalized brain space, one or more voxels in the range of the whole brain gray matter mask are marked and counted, in which each voxel uptake value of the one or more voxels is greater than the uptake value of the preset maximum ratio of the whole brain white matter amyloid PET image, and the one or more voxels are used for interpretation training and test of the classification of the machine learning.

12 Claims, 2 Drawing Sheets

(51) Int. Cl.
    *A61B 5/055*    (2006.01)
    *G01N 33/68*    (2006.01)

(56) References Cited

U.S. PATENT DOCUMENTS

| | | | |
|---|---|---|---|
| 2017/0039706 A1* | 2/2017 | Mikhno | A61B 6/501 |
| 2017/0196998 A1 | 7/2017 | Baum et al. | |
| 2019/0370970 A1 | 12/2019 | Kim | |

FOREIGN PATENT DOCUMENTS

| | | | | |
|---|---|---|---|---|
| CN | 113168536 A | 7/2021 | | |
| CN | 113707325 A | 11/2021 | | |
| CN | 114242175 A | 3/2022 | | |
| CN | 114343605 A | 4/2022 | | |
| CN | 114758774 A | 7/2022 | | |
| CN | 115443098 A | 12/2022 | | |
| KR | 102173197 B1 | 11/2020 | | |
| TW | I755048 B | 2/2022 | | |
| WO | WO-2019074172 A1 * | 4/2019 | | A61B 5/055 |
| WO | 2020010022 A1 | 1/2020 | | |
| WO | 2022030692 A1 | 2/2022 | | |
| WO | WO-2022115705 A2 * | 6/2022 | | G01N 33/6896 |

OTHER PUBLICATIONS

Nie, Binbin, et al., "A statistical parametric mapping toolbox used for voxel-wise analysis of FDG-PET images of rat brain.", PLoS One, 9.9, Sep. 2014.

Cattell, Liam, et al., "Classification of amyloid status using machine learning with histograms of oriented 3D gradients.", NeuroImage, Clinical 12, May 10, 2016, 990-1003.

Lee, Seung-Yeon, et al, "Performance evaluation in [18F] Florbetaben brain PET images classification using 3D Convolutional Neural Network.", PLoS, 16.10, Oct. 20, 2021.

Wang, Rui, et al., "Generation of synthetic PET images of synaptic density and amyloid from 18F-FDG images using deep learning.", Medical physics, 48.9 , Sep. 2021, 5115-5129.

Peng, "Development of Automatic Detection Methods for Exploration of Lesional and on-lesional Neurological Disorders with Magnetic Resonance Imaging", National Digital Library of Theses and Dissertations in Taiwan, Aug. 21, 2015 (English Abstract included).

Wang, "The quantitative analysis of Amyloid PET-Threshold based Region Ratio", p. 2~5, 9~10, 17~20, 24~28, 31, 48~49, Jan. 20, 2023 (English Abstract included).

* cited by examiner

BRAIN AMYLOID PET PROCESSING SYSTEM AND OPERATION METHOD THEREOF AND NON-TRANSITORY COMPUTER READABLE MEDIUM

RELATED APPLICATIONS

This application claims priority to Taiwan Patent Application No. 112113511, filed Apr. 11, 2023, the entirety of which is herein incorporated by reference.

BACKGROUND

Field of Invention

The present invention relates to systems and methods, and more particularly, brain amyloid positron emission tomography (PET) processing systems and operation methods thereof.

Description of Related Art

The accumulation of amyloid in the brain is still considered to be highly related to the Alzheimer's disease, so that the amyloid PET image is currently very important in the evaluation of Alzheimer's disease. Clinically, if the amyloid PET image is a negative result, the possibility of the patient being diagnosed with Alzheimer's disease will be greatly reduced. The mechanism of amyloid PET image is to use specific positron drugs to detect the accumulation of beta amyloid in the cerebral cortex.

The currently used amyloid PET drug is administered intravenously to the patient about 40 to 135 minutes before the brain PET is performed. The clinical interpretation of amyloid PET images is still based on qualitative evaluation with the naked eye. However, it is difficult to judge with the naked eye whether the gray matter absorption is higher than the white matter absorption, which also causes inconsistencies in the judgment results between different readers.

SUMMARY

In one or more various aspects, the present disclosure is directed to brain amyloid positron emission tomography (PET) processing systems and operation methods thereof.

An embodiment of the present disclosure is related to a brain amyloid PET processing system. The brain amyloid PET processing system includes a storage device and a processor. The storage device is configured to store at least one instruction, an amyloid PET image and an MRI (magnetic resonance imaging), where a resolution of the MRI is higher than a resolution of the amyloid PET image. The processor is coupled to the storage device, and the processor configured to access and execute the at least one instruction for: processing the amyloid PET image to obtain a smoothed amyloid PET image of a normalized brain space; processing the MRI to obtain a whole brain white matter mask and a whole brain gray matter mask of the normalized brain space; extracting a whole brain white matter amyloid PET image from the smoothed amyloid PET image in a range of the whole brain white matter mask of the normalized brain space, and calculating an uptake value with a preset maximum ratio in the whole brain white matter amyloid PET image; in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning.

In one embodiment of the present disclosure, the processor accesses and executes the at least one instruction for: shifting an origin point of the amyloid PET image to an anterior commissure in the amyloid PET image, and shifting an origin point of the MRI to an anterior commissure in the MRI; performing a correction of partial volume effects on the amyloid PET image; linearly co-registering the amyloid PET image to the MRI to generate a co-registered amyloid PET image.

In one embodiment of the present disclosure, the processor accesses and executes the at least one instruction for: performing a brain tissue segmentation on the MRI to obtain a whole brain gray matter density image and a whole brain white matter density image, wherein the MRI belongs to an individual brain space; converting the MRI of the individual brain space into the normalized brain space through a nonlinear deformation, so as to generate a nonlinear deformation conversion parameter; converting the whole brain gray matter density image, the whole brain white matter density image, and the co-registered amyloid PET image to the normalized brain space through the nonlinear deformation conversion parameter to generate the whole brain gray matter density image of the normalized brain space, the whole brain white matter density image of the normalized brain space, and the co-registered amyloid PET image of the normalized brain space.

In one embodiment of the present disclosure, the processor accesses and executes the at least one instruction for: smoothing the co-registered amyloid PET image of the normalized brain space to generate the smoothed amyloid PET image of the normalized brain space.

In one embodiment of the present disclosure, the processor accesses and executes the at least one instruction for: binarizing the whole brain gray matter density image of the normalized brain space and the whole brain white matter density image of the normalized brain space respectively by a threshold value to generate the whole brain white matter mask of the normalized brain space and the whole brain gray matter mask of the normalized brain space.

Another embodiment of the present disclosure is related to an operation method of a brain amyloid PET processing system. The operation method includes steps of: processing a amyloid PET image to obtain a smoothed amyloid PET image of a normalized brain space; processing an MRI to obtain a whole brain white matter mask and a whole brain gray matter mask of the normalized brain space; extracting a whole brain white matter amyloid PET image from the smoothed amyloid PET image in a range of the whole brain white matter mask of the normalized brain space, and calculating an uptake value with a preset maximum ratio in the whole brain white matter amyloid PET image; in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning.

In one embodiment of the present disclosure, the step of processing the MRI to obtain the whole brain white matter mask and the whole brain gray matter mask of the normalized brain space includes: shifting an origin point of the MRI to an anterior commissure in the MRI; performing a brain tissue segmentation on the MRI to obtain a whole brain gray matter density image and a whole brain white matter density image, wherein the MRI belongs to an individual brain space; converting the MRI of the individual brain space into the normalized brain space through a nonlinear deformation, so as to generate a nonlinear deformation conversion parameter; converting the whole brain gray matter density image and the whole brain white matter density image to the normalized brain space through the nonlinear deformation conversion parameter to generate the whole brain gray matter density image of the normalized brain space and the whole brain white matter density image of the normalized brain space; binarizing the whole brain gray matter density image of the normalized brain space and the whole brain white matter density image of the normalized brain space respectively by a threshold value to generate the whole brain gray matter mask of the normalized brain space and the whole brain white matter mask of the normalized brain space.

In one embodiment of the present disclosure, the step of processing the amyloid PET image to obtain the smoothed amyloid PET image of the normalized brain space includes: shifting an origin point of the amyloid PET image to an anterior commissure in the amyloid PET image; performing a correction of partial volume effects on the amyloid PET image; linearly co-registering the amyloid PET image to the MRI to generate a co-registered amyloid PET image; converting the co-registered amyloid PET image to the normalized brain space through the nonlinear deformation conversion parameter to generate the co-registered amyloid PET image of the normalized brain space; smoothing the co-registered amyloid PET image of the normalized brain space to generate the smoothed amyloid PET image of the normalized brain space.

In one embodiment of the present disclosure, the step of calculating the uptake value with the preset maximum ratio in the whole brain white matter amyloid PET image includes: calculating a maximum 2% of the uptake value in the whole brain white matter amyloid PET image.

In one embodiment of the present disclosure, the step of using the one or more voxels for the interpretation training and the test of the classification of the machine learning includes: summing up a number of voxels whose uptake value of each voxel in a range of the whole brain gray matter mask in the normalized brain space is greater than the uptake value with the preset maximum ratio in the whole brain white matter amyloid PET image for the interpretation training and the test of the classification of the machine learning based on a RCTU (regional cortical tracer uptake) and a BAPL (brain amyloid plaque load).

Technical advantages are generally achieved, by embodiments of the present disclosure. With the brain amyloid positron emission tomography (PET) system and its operation method of the present disclosure, the degree of absorption of gray matter and white matter can be presented more objectively, the present disclosure uses the smallest unit of image voxels to compare with each other, and can highlight whether the absorption degree of the gray matter is higher than that of the white matter under a slight absorption degree of the gray matter, thereby improving the accurate sensitivity and the consistency of interpretation.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
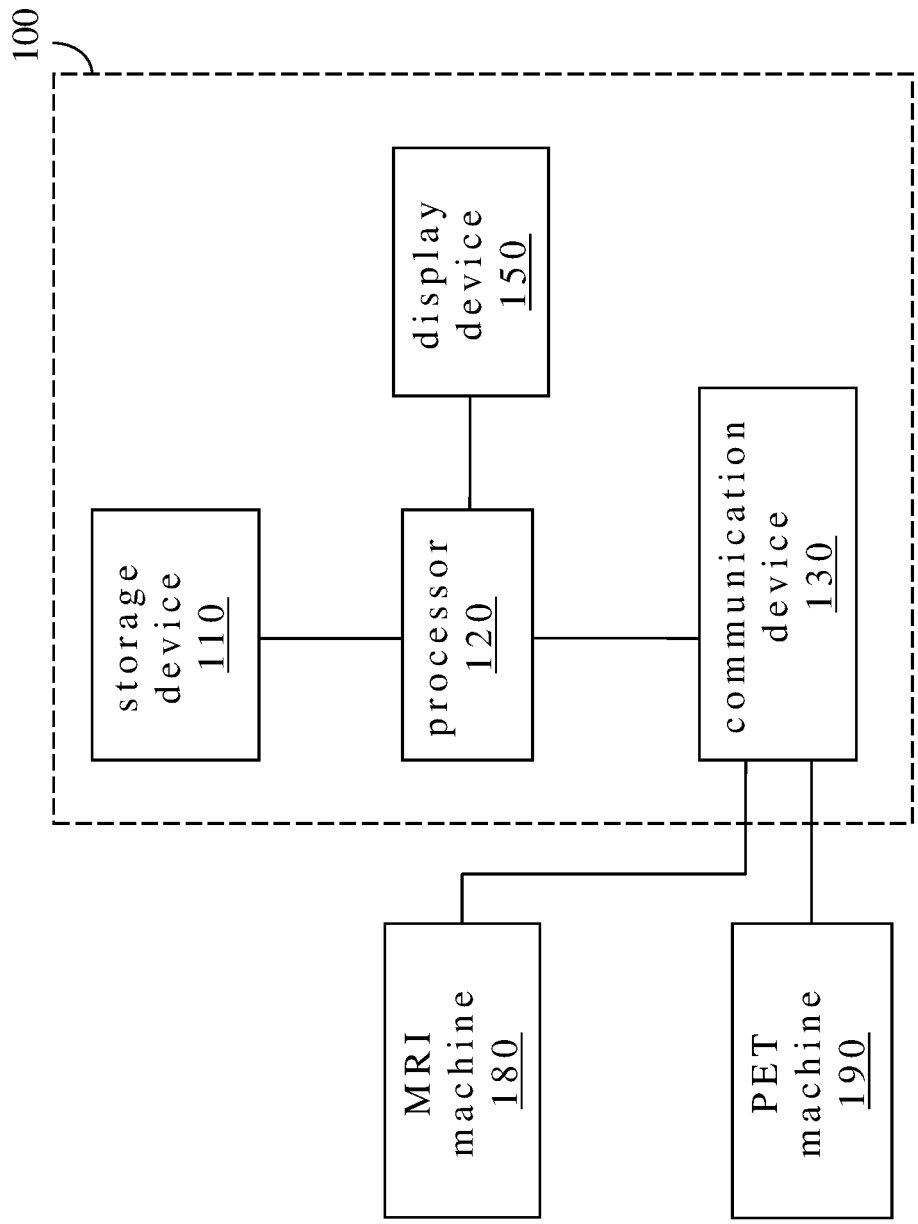
FIG. 1 is a block diagram of a brain amyloid PET processing system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to a brain amyloid PET processing system 100. The brain amyloid PET processing system 100 may be easily integrated into a computer and may be applicable or readily adaptable to all technologies. Technical advantages are generally achieved by the brain amyloid PET processing system 100 according to embodiments of the present disclosure. Herewith the brain amyloid PET processing system 100 is described below with FIG. 1.

The subject disclosure provides the brain amyloid PET processing system 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

In practice, for example, the brain amyloid PET processing system 100 can be a computer server. The computer server can be remotely managed in a manner that substantially provides accessibility, consistency, and efficiency. Remote management removes the need for input/output interfaces in the servers. An administrator can manage a large data centers containing numerous rack servers using a variety of remote management tools, such as simple terminal connections, remote desktop applications, and software tools used to configure, monitor, and troubleshoot server hardware and software.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

In practice, in an embodiment of the present disclosure, the brain amyloid positron emission tomography (PET) processing system 100 can selectively establish a connection with the MRI machine 180 and the PET machine 190. It should be understood that in the embodiments and the scope of the patent application, the description involving "connection" can generally refer to a component that indirectly communicates with another component by wired and/or wireless communication through another component, or a component that is physically connected to another element without through another element. For example, the brain amyloid positron emission tomography (PET) processing system 100 can indirectly communicate with the MRI machine 180 through wired and/or wireless communication via another component, or the brain amyloid positron emission tomography (PET) processing system 100 can be physically connected to the MRI machine 180 without another component. Those with ordinary skill in the art may select the connection manner depending on the desired application.

FIG. 1 is a block diagram of the brain amyloid PET processing system 100 according to one embodiment of the present disclosure. As shown in FIG. 1, the brain amyloid PET processing system 100 includes a storage device 110, a processor 120, a communication device 130 and a display device 150. For example, the storage device 110 can be a hard drive, a flash memory or another storage device, the processor 120 can be a central processing unit, the communication device 130 can be a wired and/or wireless network device, and the display device 150 can be a liquid crystal screen or another display apparatus.

In structure, the communication device 130 can selectively establish a connection with the MRI machine 180 and the PET machine 190, the storage device 110 is electrically connected to the processor 120, the processor 120 is electrically connected to the communication device 130, and the processor 120 is electrically connected to the display device 150. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the storage device 110 may be a built-in storage device that is directly connected to the processor 120, or the storage device 110 may be an external storage device that is indirectly connected to the processor 120 through the network device.

In practice, in some embodiments of the present disclosure, the PET machine 190 collects a plurality of original amyloid PET images from the subject, and the multiple original amyloid PET images have a two-dimensional image format; similarly, the MRI machine 180 collects a plurality of original MRI from the subject, the plurality of original MRI have a two-dimensional image format, where the aforementioned two-dimensional image format may be, for example, a DICOM (Digital Imaging and Communications in Medicine) image format. The processor 120 converts the plurality of original amyloid PET images into amyloid PET images in a three-dimensional image format, and converts the plurality of original MRI images into an MRI in a three-dimensional image format, where the aforementioned three-dimensional image format may be, for example, a 3D NIfTI-1 (Neuroimaging Informatics Technology Initiative) image format. Compared with the amyloid PET image, the MRI has a higher resolution. The MRI can help the amyloid PET image to distinguish between gray matter and white matter.

In use, the storage device 110 store at least one instruction, an amyloid PET image with a three-dimensional image format, and an MRI with a three-dimensional image format, and the processor 120 accesses and executes the at least one instruction for: processing the amyloid PET image to obtain a smoothed amyloid PET image of a normalized brain space; processing the MRI to obtain a whole brain white matter mask and a whole brain gray matter mask of the normalized brain space; extracting a whole brain white matter amyloid PET image from the smoothed amyloid PET image in a range of the whole brain white matter mask of the normalized brain space, and calculating an uptake value with a preset maximum ratio in the whole brain white matter amyloid PET image; in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning (e.g., a decision tree, a support vector machine, and so on). The display device 150 can display the aforementioned voxels on the MRI of the normalized brain space, and the processor 120 can mark the name of the brain region of clusters of the voxels and the geometric center coordinates of the clusters of the voxels in the normalized brain space on the screen of the display device 150, thereby highlighting whether the absorption degree of gray matter is higher than that of white matter, so as to improve the accurate sensitivity and the consistency of interpretation. In addition, after the interpretation training and the test of the classification of the machine learning, the interpretation model can be obtained. The interpretation model can automatically judge from the image whether the absorption degree of gray matter is higher than that of white matter.

Specifically, in some embodiments of the present disclosure, the processor 120 accesses and executes the at least one instruction for: shifting an origin point of the amyloid PET image to an anterior commissure in the amyloid PET image, and shifting an origin point of the MRI to an anterior commissure in the MRI, so as to improve the performance of subsequent image registration and spatial normalization; performing a correction of partial volume effects on the amyloid PET image, so as to distinguish gray matter from white matter more clearly; linearly co-registering (e.g., using a rigid translation) the amyloid PET image to the MRI to generate a co-registered amyloid PET image.

Then, in some embodiments of the present disclosure, the processor 120 accesses and executes the at least one instruction for: performing a brain tissue segmentation on the MRI to obtain a whole brain gray matter density image and a whole brain white matter density image, where the MRI belongs to an individual brain space; converting the MRI of the individual brain space into the normalized brain space through a nonlinear deformation (e.g., Diffeomorphic Anatomical Registration Through Exponentiated Lie Algebra), so as to generate a nonlinear deformation conversion parameter; converting the whole brain gray matter density image, the whole brain white matter density image, and the co-registered amyloid PET image to the normalized brain space through the nonlinear deformation conversion parameter to generate the whole brain gray matter density image of the normalized brain space, the whole brain white matter density image of the normalized brain space, and the co-registered amyloid PET image of the normalized brain space. In this way, the converted images are all based on the normalized brain space, which helps to greatly improve the accuracy of the above-mentioned interpretation.

Then, in some embodiments of the present disclosure, the processor 120 accesses and executes the at least one instruction for: smoothing (e.g., using 6 mm full width at half maximum) the co-registered amyloid PET image of the normalized brain space to generate the smoothed amyloid PET image of the normalized brain space, thereby reducing the noise of the image.

On the other hand, in some embodiments of the present disclosure, the processor 120 accesses and executes the at least one instruction for: binarizing the whole brain gray matter density image of the normalized brain space and the whole brain white matter density image of the normalized brain space respectively by a threshold value (e.g., about 0.5) to generate the whole brain gray matter mask of the normalized brain space and the whole brain white matter mask of the normalized brain space, so as to help the smoothed amyloid PET image of the normalized brain space to be accurately distinguished the whole brain white matter amyloid PET image from the whole brain gray matter amyloid PET image.

Figure 2:
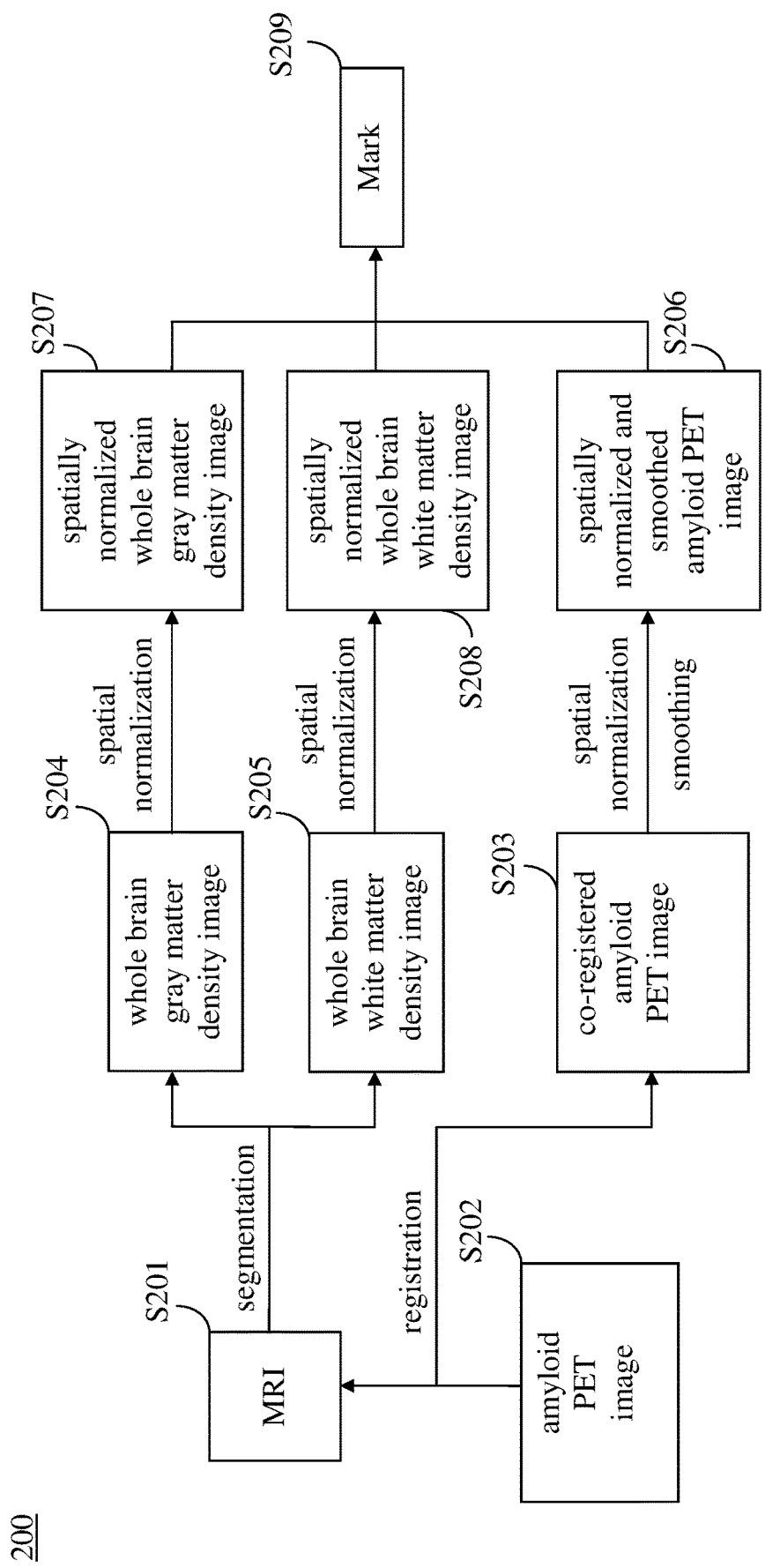
FIG. 2 is a flow chart of an operation method of the brain amyloid PET processing system according to one embodiment of the present disclosure.

For a more complete understanding of an operation method of the brain amyloid PET processing system 100, referring FIGS. 1-2, FIG. 2 is a flow chart of the operation method 200 of the brain amyloid PET processing system 100 according to one embodiment of the present disclosure. As shown in FIG. 2, the operation method 200 includes operations S201-S209. However, as could be appreciated by persons having ordinary skill in the art, for the steps described in the present embodiment, the sequence in which these steps are performed, unless explicitly stated otherwise, can be altered depending on actual needs; in certain cases, all or some of these steps can be performed concurrently.

The operation method 200 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random-access memory (SRAM), dynamic random-access memory (DRAM), and double data rate random-access memory (DDR-RAM); optical storage devices such as compact disc read-only memories (CD-ROMs) and digital versatile disc read-only memories (DVD-ROMs); and magnetic storage devices such as hard disk drives and floppy disk drives.

In operation S201, the MRI machine 180 collects a plurality of original MRI of the subject in a two-dimensional image format, and the processor 120 converts the plurality of original MRI in the two-dimensional image format into an MRI in a three-dimensional image format. The storage device 110 stores the MRI in the three-dimensional image format.

In operation S202, the PET machine 190 collects a plurality of original amyloid PET images of the subject in a two-dimensional image format, and the processor 120 converts the plurality of original amyloid PET images in the two-dimensional image format into an amyloid PET image in a three-dimensional image format image. The storage device 110 stores the amyloid PET image in the three-dimensional image format. Compared with the amyloid PET image, the MRI has a higher resolution.

In some embodiments of the present disclosure, in operations S201, S203, and S206, the amyloid PET image is processed to obtain a smoothed amyloid PET image of normalized brain space (e.g., a spatially normalized and smoothed amyloid PET image). In operations S202, S204, S205, S207 and S208, the MRI is processed to obtain the whole brain white matter mask of the normalized brain space (e.g., a spatially normalized whole brain white matter density image) and the whole brain gray matter mask of the normalized brain space (e.g., a spatially normalized whole brain gray matter density image). In operation S209, the whole brain white matter amyloid PET image is extracted from the smoothed amyloid PET image in the range of the whole brain white matter mask of the normalized brain space, and the uptake value with the preset maximum ratio in the whole brain white matter amyloid PET image is calculated; in the smoothed amyloid PET image of the normalized brain space, one or more voxels in the range of the whole brain gray matter mask are marked and counted, in which each voxel uptake value of the one or more voxels is greater than the uptake value of the preset maximum ratio of the whole brain white matter amyloid PET image, and the one or more voxels are used for interpretation training and test of the classification of the machine learning.

Regarding the processes of the MRI, in some embodiments of the present disclosure, in operation S201, the origin point of the MRI is shifted to the anterior commissure in the MRI. In operations S204 and S205, a brain tissue segmentation is performed on the MRI to obtain a whole brain gray matter density image and a whole brain white matter density image, where the MRI belongs to an individual brain space of the subject; the MRI of the individual brain space is converted into the normalized brain space through a nonlinear deformation, so as to generate a nonlinear deformation conversion parameter. In operations S207 and S208, the whole brain gray matter density image and the whole brain white matter density image are converted to the normalized brain space through the nonlinear deformation conversion parameter to generate the whole brain gray matter density image of the normalized brain space and the whole brain white matter density image of the normalized brain space; the whole brain gray matter density image of the normalized brain space and the whole brain white matter density image of the normalized brain space are binarized respectively by a threshold value to generate the whole brain gray matter mask of the normalized brain space and the whole brain white matter mask of the normalized brain space.

Regarding the processes of the amyloid PET image, in some embodiments of the present disclosure, in operation S202, the origin point of the amyloid PET image is shifted to the anterior commissure in the amyloid PET image; the correction of partial volume effects is performed on the amyloid PET image. In operation S203, the amyloid PET image is linearly co-registered to the MRI to generate a co-registered amyloid PET image. In operation S206, the co-registered amyloid PET image is converted to the normalized brain space through the nonlinear deformation conversion parameter to generate the co-registered amyloid PET image of the normalized brain space; the co-registered amyloid PET image of the normalized brain space is smoothed to generate the smoothed amyloid PET image of the normalized brain space.

Regarding one specific way of calculating the uptake value with the preset maximum ratio in the whole brain white matter amyloid PET image in step S209, in one embodiment of the present disclosure, the maximum 2% of the uptake value in the whole brain white matter amyloid PET image is calculated, where the maximum 2% of the uptake value is roughly the top 2% uptake value. In practice, for example, a maximum uptake value of approximately 2% corresponds to a maximum grayscale intensity value of approximately 2% in the image; in other words, the higher the grayscale intensity value, the higher the uptake value. In practice, for example, compared with other values, using an uptake value of up to about 2% has better accuracy for subsequent interpretation, but the present disclosure is not limited to this value.

Regarding one specific manner of performing the interpretation training and the test of the classification of the machine learning, in some embodiments of the present disclosure, the step of using the one or more voxels for the interpretation training and the test of the classification of the machine learning includes: summing up a number of voxels whose uptake value of each voxel in a range of the whole brain gray matter mask in the normalized brain space is greater than the uptake value with the preset maximum ratio in the whole brain white matter amyloid PET image for the interpretation training and the test of the classification of the machine learning based on a RCTU (regional cortical tracer uptake) and a BAPL (brain amyloid plaque load).

In practice, for example, the interpretation principle is to compare whether the absorption of the drug in the gray matter area of the brain is higher than the absorption of the drug in the white matter area, and then develop to use the two scores of RCTU and BAPL to determine whether the image result is positive or negative. For the four main areas of gray matter in the brain: lateral temporal lobe, frontal cortex, precuneus and posterior cingulate cortex, and parietal lobe, RCTU scores were determined separately (1 point: the entire gray matter absorption is lower than the white matter absorption; 2 points: the partial gray matter absorption is higher than white matter absorption; 3 points: the whole gray matter absorption is higher than white matter absorption). When the RCTU in the above four areas is 1 point, the overall BAPL score is 1 point, which is judged as "negative image result"; when the RCTU in the above four areas is up to 2 points, the overall BAPL score is 2 points, it is judged as "positive imaging result"; when the RCTU in the above-mentioned four areas reaches a maximum of 3 points, the overall BAPL score is 3 points, which is also judged as "positive imaging result". In practice, it is sometimes difficult for the naked eye to judge whether the absorption of the gray matter is higher than that of the white matter when a slight absorption degree of gray matter (for example: RCTU 2 points), which also causes inconsistencies in the judgment results between different readers. The brain amyloid positron emission tomography (PET) processing system 100 and its operating method 200 of the present disclosure can highlight whether the absorption degree of gray matter is higher than that of white matter under a slight absorption degree of the gray matter.

In practice, for example, a 71-year-old male is clinically diagnosed as mild cognitive impairment (MCI). In the case of the brain amyloid PET image interpreted with the naked eye, it cannot be ruled out whether there is a slight absorption degree of the gray matter (RCTU 2 points). After image processing by the brain amyloid positron emission tomography (PET) processing system 100 and its operating method 200 of the present disclosure, the display device 150 shows that the voxel cluster is highlighted in the gray matter of the right frontal lobe, which means that there is an area with higher drug uptake intensity in the gray matter of the right frontal lobe than in the white matter, so this image is judged to be a positive result.

In practice, for example, a 76-year-old female is clinically considered to be a healthy female. In the case of brain amyloid PET image interpreted with the naked eye, it cannot be ruled out whether there is a slight absorption degree of the gray matter (RCTU 2 points). After image processing by the brain amyloid positron emission tomography (PET) processing system 100 and its operating method 200 of the present disclosure, the display device 150 shows that no voxels cluster is prominent in the gray matter of the brain, which means that the drug uptake intensity in the gray matter area is not higher than that in the white matter area, so this image is judged to be a negative result.

In view of the above, technical advantages are generally achieved, by embodiments of the present disclosure. With the brain amyloid PET processing system 100 and its operation method 200 of the present disclosure, the degree of absorption of gray matter and white matter can be presented more objectively, the present disclosure uses the smallest unit of image voxels to compare with each other, and can highlight whether the absorption degree of gray matter is higher than that of white matter under a slight absorption degree of gray matter, thereby improving the accurate sensitivity and the consistency of interpretation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A brain amyloid PET (positron emission tomography) processing system, comprising:
    a storage device configured to store at least one instruction, an amyloid PET image and an MRI (magnetic resonance imaging), wherein a resolution of the MRI is higher than a resolution of the amyloid PET image; and
    a processor coupled to the storage device, and the processor configured to access and execute the at least one instruction for:
        processing the amyloid PET image to obtain a smoothed amyloid PET image of a normalized brain space;
        processing the MRI to obtain a whole brain white matter mask and a whole brain gray matter mask of the normalized brain space;
        extracting a whole brain white matter amyloid PET image from the smoothed amyloid PET image in a range of the whole brain white matter mask of the normalized brain space, and calculating an uptake value with a preset maximum ratio in the whole brain white matter amyloid PET image;
        in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning;
        shifting an origin point of the amyloid PET image to an anterior commissure in the amyloid PET image, and shifting an origin point of the MRI to an anterior commissure in the MRI;
        performing a correction of partial volume effects on the amyloid PET image; and
        linearly co-registering the amyloid PET image to the MRI to generate a co-registered amyloid PET image.

2. The brain amyloid PET processing system of claim 1, wherein the processor accesses and executes the at least one instruction for:
- performing a brain tissue segmentation on the MRI to obtain a whole brain gray matter density image and a whole brain white matter density image, wherein the MRI belongs to an individual brain space;
- converting the MRI of the individual brain space into the normalized brain space through a nonlinear deformation, so as to generate a nonlinear deformation conversion parameter; and
- converting the whole brain gray matter density image, the whole brain white matter density image, and the co-registered amyloid PET image to the normalized brain space through the nonlinear deformation conversion parameter to generate the whole brain gray matter density image of the normalized brain space, the whole brain white matter density image of the normalized brain space, and the co-registered amyloid PET image of the normalized brain space.

3. The brain amyloid PET processing system of claim 2, wherein the processor accesses and executes the at least one instruction for:
- smoothing the co-registered amyloid PET image of the normalized brain space to generate the smoothed amyloid PET image of the normalized brain space.

4. The brain amyloid PET processing system of claim 2, wherein the processor accesses and executes the at least one instruction for:
- binarizing the whole brain gray matter density image of the normalized brain space and the whole brain white matter density image of the normalized brain space respectively by a threshold value to generate the whole brain gray matter mask of the normalized brain space and the whole brain white matter mask of the normalized brain space.

5. An operation method of a brain amyloid PET processing system, and the operation method comprising steps of:
- processing an amyloid PET image to obtain a smoothed amyloid PET image of a normalized brain space;
- processing an MRI to obtain a whole brain white matter mask and a whole brain gray matter mask of the normalized brain space;
- extracting a whole brain white matter amyloid PET image from the smoothed amyloid PET image in a range of the whole brain white matter mask of the normalized brain space, and calculating an uptake value with a preset maximum ratio in the whole brain white matter amyloid PET image; and
- in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning,
- wherein the step of processing the MRI to obtain the whole brain white matter mask and the whole brain gray matter mask of the normalized brain space comprises: shifting an origin point of the MRI to an anterior commissure in the MRI; performing a brain tissue segmentation on the MRI to obtain a whole brain gray matter density image and a whole brain white matter density image, wherein the MRI belongs to an individual brain space; converting the MRI of the individual brain space into the normalized brain space through a nonlinear deformation, so as to generate a nonlinear deformation conversion parameter; converting the whole brain gray matter density image and the whole brain white matter density image to the normalized brain space through the nonlinear deformation conversion parameter to generate the whole brain gray matter density image of the normalized brain space and the whole brain white matter density image of the normalized brain space; and binarizing the whole brain gray matter density image of the normalized brain space and the whole brain white matter density image of the normalized brain space respectively by a threshold value to generate the whole brain gray matter mask of the normalized brain space and the whole brain gray matter mask of the normalized brain space.

6. The operation method of claim 5, wherein the step of processing the amyloid PET image to obtain the smoothed amyloid PET image of the normalized brain space comprises:
- shifting an origin point of the amyloid PET image to an anterior commissure in the amyloid PET image;
- performing a correction of partial volume effects on the amyloid PET image;
- linearly co-registering the amyloid PET image to the MRI to generate a co-registered amyloid PET image;
- converting the co-registered amyloid PET image to the normalized brain space through the nonlinear deformation conversion parameter to generate the co-registered amyloid PET image of the normalized brain space; and
- smoothing the co-registered amyloid PET image of the normalized brain space to generate the smoothed amyloid PET image of the normalized brain space.

7. The operation method of claim 5, wherein the step of calculating the uptake value with the preset maximum ratio in the whole brain white matter amyloid PET image comprises:
- calculating a maximum 2% of the uptake value in the whole brain white matter amyloid PET image.

8. The operation method of claim 5, wherein the step of using the one or more voxels for the interpretation training and the test of the classification of the machine learning comprises:
- summing up a number of voxels whose uptake value of each voxel in a range of the whole brain gray matter mask in the normalized brain space is greater than the uptake value with the preset maximum ratio in the whole brain white matter amyloid PET image for the interpretation training and the test of the classification of the machine learning based on a RCTU (regional cortical tracer uptake) and a BAPL (brain amyloid plaque load).

9. A non-transitory computer readable medium to store a plurality of instructions for commanding a computer to execute an operation method, and the operation method comprising steps of:
- processing a amyloid PET image to obtain a smoothed amyloid PET image of a normalized brain space;
- processing an MRI to obtain a whole brain white matter mask and a whole brain gray matter mask of the normalized brain space;
- extracting a whole brain white matter amyloid PET image from the smoothed amyloid PET image in a range of the whole brain white matter mask of the normalized brain space, and calculating an uptake value with a preset maximum ratio in the whole brain white matter amyloid PET image; and in the smoothed amyloid PET image of the normalized brain space, marking and counting one or more voxels in a range of the whole brain gray matter mask, wherein each voxel uptake value of the one or more voxels is greater than the uptake value of the preset maximum ratio of the whole brain white matter amyloid PET image, and using the one or more voxels for an interpretation training and a test of a classification of a machine learning, wherein the step of processing the MRI to obtain the whole brain white matter mask and the whole brain gray matter mask of the normalized brain space comprises: shifting an origin point of the MRI to an anterior commissure in the MRI; performing a brain tissue segmentation on the MRI to obtain a whole brain gray matter density image and a whole brain white matter density image, wherein the MRI belongs to an individual brain space; converting the MRI of the individual brain space into the normalized brain space through a nonlinear deformation, so as to generate a nonlinear deformation conversion parameter; converting the whole brain gray matter density image and the whole brain white matter density image to the normalized brain space through the nonlinear deformation conversion parameter to generate the whole brain gray matter density image of the normalized brain space and the whole brain white matter density image of the normalized brain space; and binarizing the whole brain gray matter density image of the normalized brain space and the whole brain white matter density image of the normalized brain space respectively by a threshold value to generate the whole brain gray matter mask of the normalized brain space and the whole brain gray matter mask of the normalized brain space.

10. The non-transitory computer readable medium of claim 9, wherein the step of processing the amyloid PET image to obtain the smoothed amyloid PET image of the normalized brain space comprises:

shifting an origin point of the amyloid PET image to an anterior commissure in the amyloid PET image;

performing a correction of partial volume effects on the amyloid PET image;

linearly co-registering the amyloid PET image to the MRI to generate a co-registered amyloid PET image;

converting the co-registered amyloid PET image to the normalized brain space through the nonlinear deformation conversion parameter to generate the co-registered amyloid PET image of the normalized brain space; and smoothing the co-registered amyloid PET image of the normalized brain space to generate the smoothed amyloid PET image of the normalized brain space.

11. The non-transitory computer readable medium of claim 10, wherein the step of calculating the uptake value with the preset maximum ratio in the whole brain white matter amyloid PET image comprises:

calculating a maximum 2% of the uptake value in the whole brain white matter amyloid PET image.

12. The non-transitory computer readable medium of claim 9, wherein the step of using the one or more voxels for the interpretation training and the test of the classification of the machine learning comprises:

summing up a number of voxels whose uptake value of each voxel in a range of the whole brain gray matter mask in the normalized brain space is greater than the uptake value with the preset maximum ratio in the whole brain white matter amyloid PET image for the interpretation training and the test of the classification of the machine learning based on a RCTU and a BAPL.

* * * * *